Sept. 16, 1958   O. K. AUSTIN   2,852,346
PROCESS AND APPARATUS FOR THE PRODUCTION OF CARBON BLACK
Filed Aug. 23, 1954   3 Sheets-Sheet 1

INVENTOR.
Oliver K. Austin
BY
Hudson and Young
ATTORNEYS

Sept. 16, 1958     O. K. AUSTIN     2,852,346
PROCESS AND APPARATUS FOR THE PRODUCTION OF CARBON BLACK
Filed Aug. 23, 1954     3 Sheets-Sheet 2

INVENTOR.
Oliver K. Austin
BY
*Hudson and Young*
ATTORNEYS

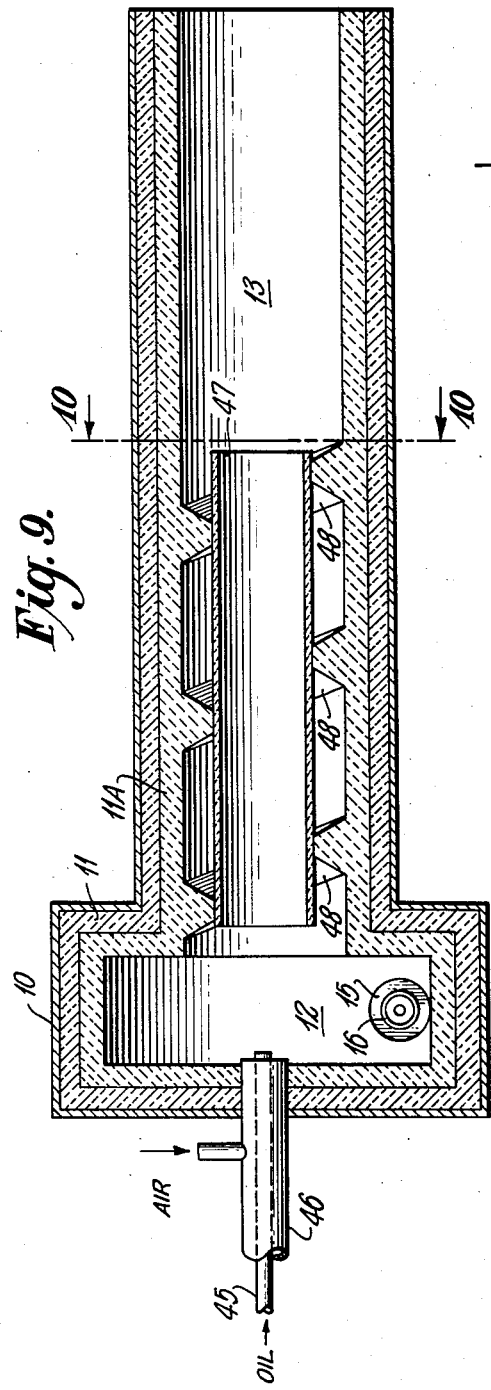
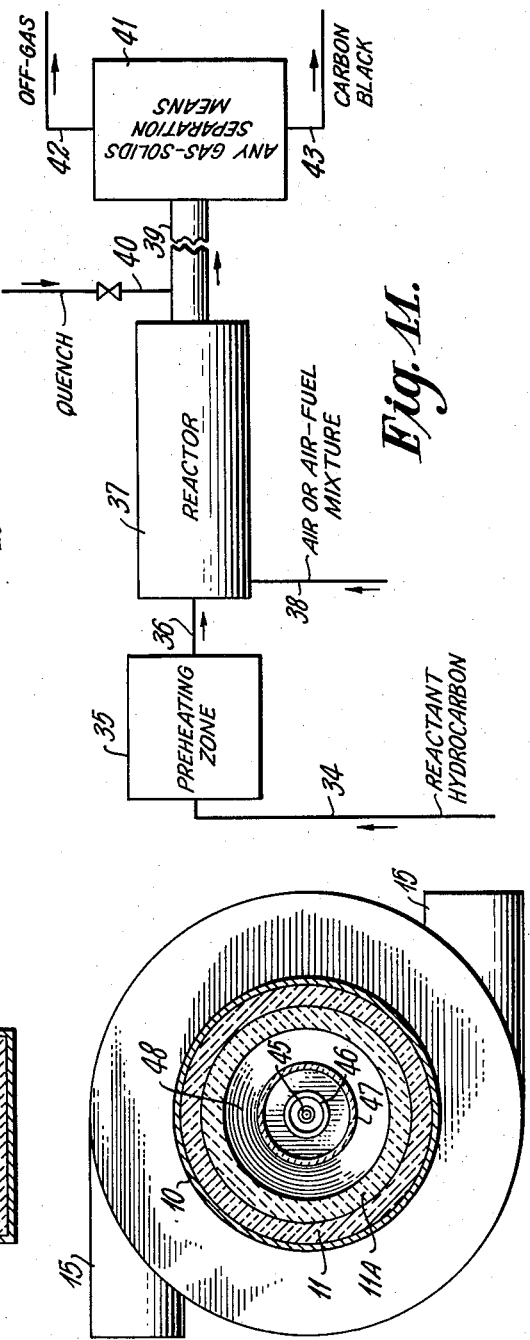

United States Patent Office 2,852,346
Patented Sept. 16, 1958

2,852,346

PROCESS AND APPARATUS FOR THE PRODUCTION OF CARBON BLACK

Oliver K. Austin, Borger, Tex., assignor to Phillips Petroleum Company, a corporation of Delaware Application August 23, 1954, Serial No. 451,432

21 Claims. (Cl. 23—209.6)

This invention relates to a process and an apparatus for the production of carbon black by the pyrolysis or partial combustion of a hydrocarbon. In one aspect, the invention relates to an improved carbon black producing reactor having increased radiant surface area. In another aspect, the invention relates to a process wherein a reactant mixture is subjected to radiation from a helical refractory. In still another aspect, the invention relates to a carbon black production reactor having one or more refractory ribs positioned in the reaction section. In another aspect, it relates to a novel refractory unit useful in a carbon black production furnace.

This application is a continuation-in-part of my copending application Serial No. 387,642, filed October 22, 1953, now abandoned.

It is known in the prior art to produce carbon black by maintaining a helically moving sheath of hot combustion gas and/or flame in a cylindrical reactor, passing a reactant hydrocarbon into the interior of the sheath, whereby the hydrocarbon is heated to a carbon black forming temperature, and recovering carbon black so produced. In U. S. Patents 2,375,795, 2,375,796, 2,375,-797, and 2,375,798 (1945) to J. C. Krejci, there is described a process of the type mentioned above wherein the helically moving sheath is produced by directing air or a mixture of air and gas or air and liquid fuel tangentially into a cylindrical reaction chamber, simultaneously passing, axially, into said chamber a stream of reactant hydrocarbon and reacting said hydrocarbon in said chamber to form carbon black. U. S. Patent 2,564,700 (1951) to the same inventor discloses and claims an improvement in this type of process in which the helically moving sheath of combustion gas is produced in a combustion zone immediately upstream from the cylindrical reaction zone, complete combustion of the fuel-air or fuel-oxygen mixture tangentially introduced being effected prior to the entry of the helically moving gas into the reaction chamber. Processes of the type described in the cited patents have been of substantial commercial importance because of the capacity of such processes to produce, at high rates, high-quality carbon black suitable for use in the compounding of tire-tread stocks. Efforts are constantly being made, however, to increase the yield and quality of carbon black produced by these and other processes.

It is also known in the prior art to inject a reactant hydrocarbon into a cylindrical furnace, while nonaxially and longitudinally injecting hot combustion gas into said furnace, whereby the reactant hydrocarbon is heated to a carbon black forming temperature and carbon black is produced. Examples of such a process are shown in Williams U. S. Patents 2,625,466 and 2,643,182 (1953).

Experimental investigations have indicated that it is desirable to have a maximum radiant surface area within a carbon black reactor and still not obstruct substantially the flow of gas through the reactor. This invention provides a process and an apparatus wherein such an objective is attained and pyrolysis of hydrocarbon to form carbon black is thus facilitated.

According to this invention, a carbonaceous reactant, heated to a carbon black forming temperature, e. g. 2300 to 3500° F., is passed adjacent or along a raised refractory surface in a reaction zone, and carbon black thus formed is recovered.

Also according to this invention, there is provided, in a reaction chamber of a carbon black production reactor, at least one raised refractory rib member, which provides increased radiant area without undue obstruction of flow. The raised rib member can be straight and substantially parallel to the reactor axis or it can be helical and coaxial with the reactor. One or more such rib members can be utilized.

According to one modification of this invention, there is provided, in a process in which a hydrocarbon is heated to a carbon black forming temperature by direct heat exchange with a surrounding sheath of hot helically moving gas or flame, the step which comprises passing a gaseous mixture, resulting from the contact of said sheath with a reactant hydrocarbon, along a radiant helical surface whereby said hydrocarbon is reacted to form carbon black.

According to a further modification of this invention, there is provided a novel carbon black production reactor which comprises, in combination: a substantially cylindrical reaction chamber, inlet means at one end of said chamber, outlet means at the opposite end of said chamber, a refractory helix positioned within said chamber contiguously with the walls thereof, and tangential inlet means in said reactor adapted to direct flow of fluid in a direction corresponding to that of the helical refractory.

Figure 9 is a side elevational view of a modified reactor according to this invention.

Figure 10 is a sectional view taken along line 10—10 of Figure 9.

Figure 11 is a flow diagram of a process wherein the present invention is utilized.

Figure 1:
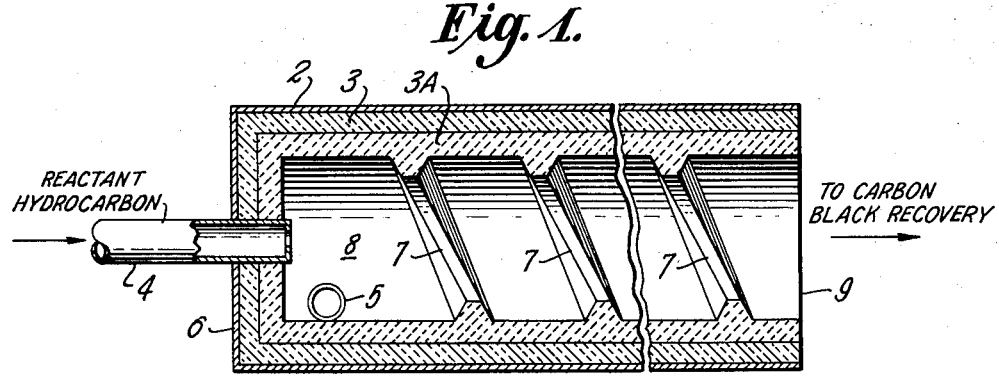
Figure 1 illustrates diagrammatically one embodiment of this invention wherein there is provided, in a carbon black reactor of the type described in Krejci Patent 2,375,795, a helical refractory member positioned within the reactor.

As shown in Figure 1, the apparatus comprises an external cylindrical shell 2, ordinarily made of metal and lined with insulation 3 and a refractory 3A, such as refractory alumina or zirconia. Extending through the end wall 6 of reactor 2, is hydrocarbon inlet 4 which is substantially coaxially positioned with respect to cylindrical reactor 2. This type of reactor and the operation thereof are described in detail in Krejci Patent 2,375,795.

According to this invention, there is positioned within reactor 2, a substantially helical refractory member 7, the outer part of which is positioned against and conforms to the internal wall of cylindrical reactor 2. Tangential inlet means 5 is positioned so that it directs fluid in a substantially helical path through reaction zone 8. Inlet 5 is so positioned that the helical path of the gas directed through the reactor corresponds to the direction of helical refractory 7. Thus the flow of gas introduced tangentially through inlet 5 conforms to the course of helical refractory 7.

In the operation of the illustrated reactor, a reactant hydrocarbon, such as natural gas, butane, recycle gas oil, or other suitable hydrocarbon, is vaporized and passed through inlet 4 and directed axially into reaction zone 8. At the same time, air or other oxygen-containing gas, or a combustible mixture of air and fuel, enters through tangential inlet 5 at such a pressure and velocity that a helical sheath of flame and/or combustion gas is produced adjacent the inner wall of reactor 2. By virtue of the partial combustion within reaction space 8 or by virtue of heat contained in combustion gas produced when a mixture of gas and air is tangentially introduced, the reactant hydrocarbon introduced through inlet 4 is rapidly heated to a carbon black forming temperature. A resulting mixture of gas passes along the surface of helical refractory 7, which surface is heated to incandescence and imparts radiant energy to the reacting gas, thus facilitating the carbon black forming reaction. A mixture comprising combustion gas with carbon black suspended therein passes through open end 9 of the reactor to carbon black recovery means, not shown in the drawing. Such recovery means is well known to those skilled in the art and ordinarily comprises a water quench followed by solids recovery equipment, such as one or more Cottrell precipitators or cyclone separators and/or one or more bag filters.

Figure 2:
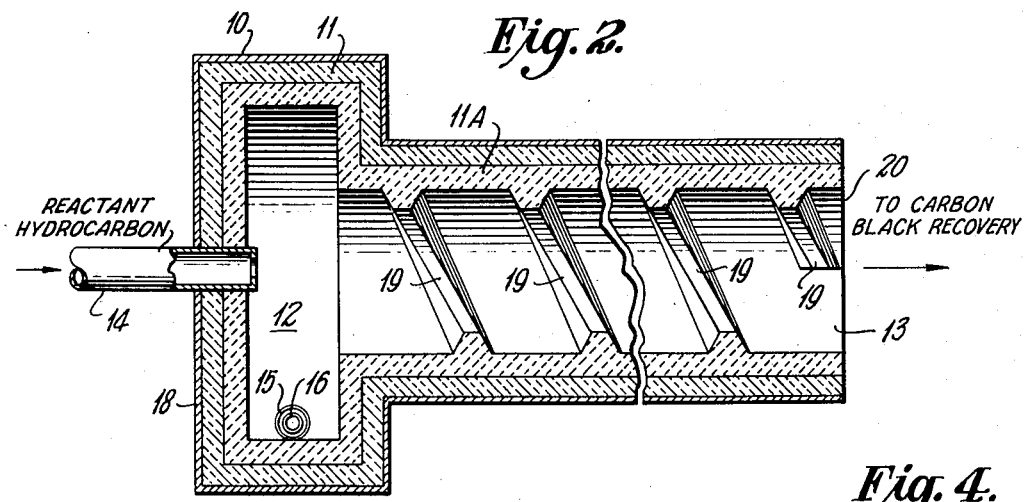
Figure 2 illustrates another embodiment of this invention wherein a helical refractory member is positioned in a precombustion-type reactor.

Figure 2 illustrates another embodiment of my invention as applied to a so-called precombustion type furnace process of the type described in Krejci Patent 2,564,700 (1951).

In the operation of a precombustion type furnace, a combustible mixture of fuel gas and air enters burner 16 positioned in tangential inlet 15, which is constructed to be tangential to the inner wall of combustion zone 12. As set forth in detail in Patent 2,564,700, the combustible mixture is substantially completely reacted by combustion in a peripheral part of combustion zone 12. Usually the combustion is substantially complete within inlet 15. Thus, combustion is complete before resulting combustion gas reaches the inner or central part of combustion zone 12. The whirling body of combustion gas so produced then flows in a helical path adjacent the walls of reaction section 13. Reactant hydrocarbon, of the type previously set forth herein, enters the reactor through inlet 14 and proceeds axially through the reactor. The hydrocarbon is rapidly heated by direct contact with the helical sheath of hot combustion gas and is reacted by pyrolysis to form carbon black which passes from the furnace through open end 20 to communicating carbon black recovery means of the type already described. The reactor comprises an external metal shell 10 lined with insulation 11 and refractory liner 11A as already discussed. As shown in the drawing, the diameter of combustion zone 12 is substantially greater than that of reaction zone 13. Ordinarily, the diameter of combustion zone 12 is greater than its length, and the diameter of reaction zone 13 is less than its length. The hydrocarbon inlet tube 14 extends through end wall 18 of reactor 10.

According to this invention, there is positioned in reaction section 13 a helical refractory member 19 constructed of a refractory material of the type already described. Tangential inlet 15 is positioned so as to direct incoming gas in a helical path which generally conforms in direction to the course of helical refractory 19.

In the operation of the process according to this invention, a combustible mixture of oxygen-containing gas and fuel enters through burner 16 and tangential inlet 15 and is converted by combustion, forming hot combustion gas which proceeds through reaction zone 13 as described. Helical refractory 19 is thus heated to incandescence. A reactant hydrocarbon, such as a vaporized aromatic gas oil, enters through axial inlet 14 and is heated to a carbon black forming temperature near the inlet of reaction section 13 by virtue of heat imparted from hot combustion gas. A resulting gas mixture passes along the radiant surfaces of helical refractory 19, thus receiving radiant energy which facilitates the carbon black forming reaction.

Although shown in the drawings to be in the form of an isosceles trapezoid, the cross section of helical refractories 7 and 19 may be of any desired shape, such as triangular, square, rectangular, or semicircular.

Figure 3:
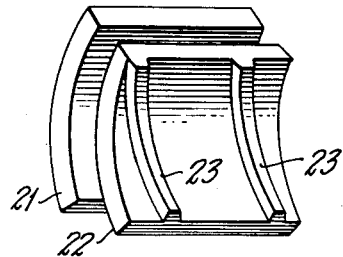
Figure 3 is a perspective view of a refractory unit according to this invention.
Figure 4:
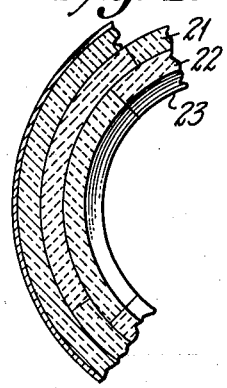
Figure 4 is an end view of the unit shown in Figure 3.

Figures 3 and 4 show in detail, a structural unit for use in the construction of apparatus according to this invention, Figure 4 being an end view of the structure shown in Figure 3, and set in position within a carbon black reactor such as reactor 10 in Figure 2.

Figure 3A:
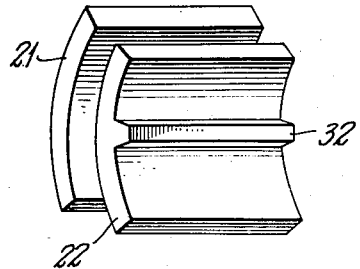
Figure 3A is a perspective view of another refractory unit according to this invention.

Figure 3A shows a perspective view of a structural refractory unit which is similar to that of Figure 3 except that it is provided with a longitudinal rib 32. This type of structural unit is especially adapted for use in a furnace of the type shown in Figure 6, which is subsequently described herein.

According to Figures 3 and 4, there is provided an integral refractory unit comprising an offset base member 21, a liner member 22, and a helical rib member 23. Each of members 21, 22, and 23 can correspond to a 120° arc, so that three of the illustrated units can be positioned in the interior of a cylindrical reactor at a given point along its length, or any other arc length can be used, as desired. The offset base 21 provides an interlocking arrangement with other like refractory units positioned within a cylindrical reactor. Members 21, 22, and 23 can form a single piece of refractory or each can be separately formed and the three can be assembled in the configuration shown.

Figure 5:
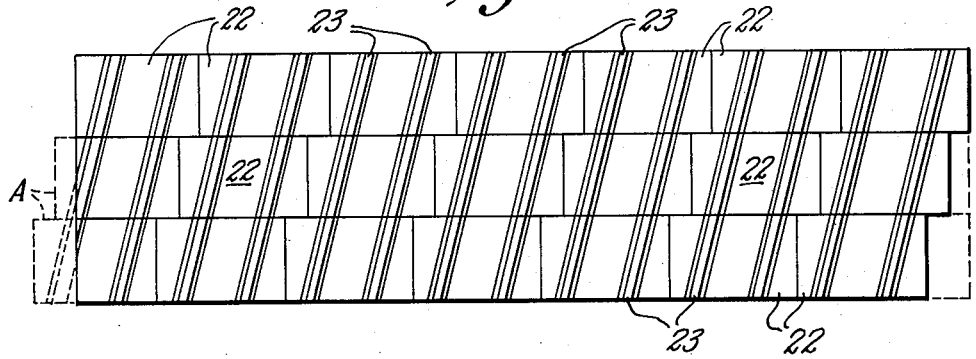
Figure 5 is a developed internal view of a reactor lined with units of the type shown in Figures 3 and 4.

Figure 5 shows a developed or "flattened out" view of the interior of a reactor lined with refractory units of the type shown in Figures 3 and 4. After the units have been placed in a reaction section such as section 13 in Figure 3, the shaded portions A (Fig. 5) will project into the combustion chamber 12. These portions are cut away and removed after the units have been secured in place. When the units are secured in the reaction section, they form a continuous cylindrical inner surface 22 with a raised helical rib 23 extending along the interior surface.

In one example of apparatus constructed according to this invention, units of the type shown in Figures 3 and 4 are arranged as shown in Figure 5 in the interior of the reaction chamber 13 of a reactor of the type shown in Figure 2. Each unit represents an arc length of 120°. The internal radius of liner member 22 is 7½ inches. The altitude of rib 23, which has an isoceles trapezoidal cross-section, is 2 inches. The major base of the rib cross section is 2 inches in length and the minor base is 1 inch in length. The pitch of the helical rib is 6¹³⁄₁₆ inches.

Figure 6:
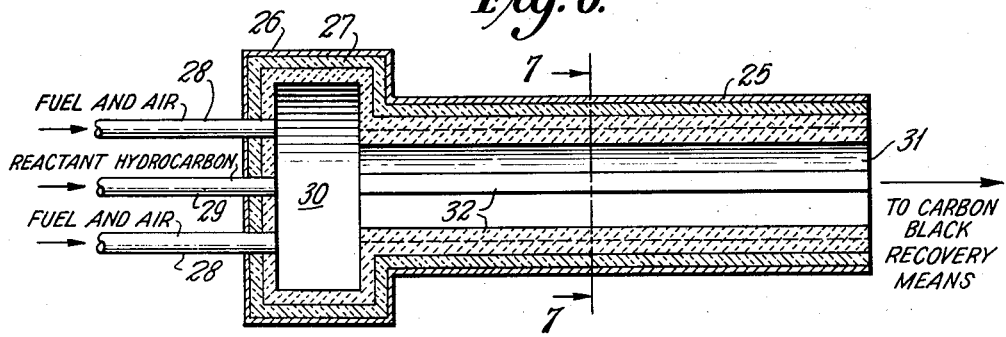
Figure 6 illustrates a further embodiment of the invention in connection with a nontangential-type reactor.
Figure 7:
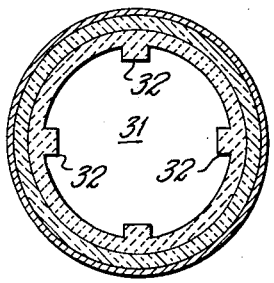
Figure 7 is a cross-sectional view taken along line 7—7 in Figure 6.

Figures 6 and 7 illustrates a modification of this invention as applied to a carbon black process and furnace wherein predominantly longitudinal (nontangential) flow is utilized.

According to Figure 6, reactant hydrocarbon enters chamber 30 of reactor 25 through inlet 29. Air can be mixed with the reactant hydrocarbon, by means not shown, prior to or simultaneously with the entry of the reactant hydrocarbon into reactor 25. A combustible mixture of fuel and air or oxygen enters reactor 25 through a plurality of inlets 28. Reactor 25 comprises metal shell 26 lined with refractory or heat-insulating material 27. Hot combustion gas and reactant hydrocarbon pass through reaction zone 31, wherein the reactant hydrocarbon is converted to carbon black, which is recovered by conventional means.

According to this invention, refractory ribs 32 are positioned in reaction zone 31 to provide additional radiant surface, which facilitates the carbon black-forming reaction.

Figure 8:
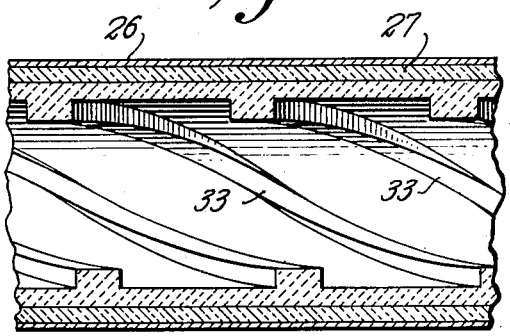
Figure 8 illustrates a modification of the apparatus shown in Figures 6 and 7.

As shown in Figure 8, helical ribs 33 of high pitch can be utilized in a furnace of the type shown in Figures 6 and 7. In such an embodiment the pitch of each helical rib can be as great as the length of the reaction chamber 31 or greater, but preferably not less than half the length of the reaction chamber. Thus, a slight helical motion is imparted to the gases in the furnace and a greater effective refractory surface is provided than that provided in the embodiment shown in Figures 6 and 7.

Figures 9 and 10 illustrate a reactor, according to this invention, which can be considered a modified form of the reactor previously described in connection with Figure 2.

As previously described in connection with Figure 2, the reactor comprises outer shell 10, ordinarily of metal, insulation 11, and refractory liner 11A. Within the reactor are combustion zone 12 and reaction zone 13. In the end wall of combustion zone 12 is an axially positioned oil inlet which comprises oil tube 45 and air jacket 46. Reactant oil is supplied to the reactor through tube 45, and air is passed through the annular jacket 46. The effect of the air is to cool and protect the oil inlet 45, to aid in the atomization of oil when the oil is supplied in the liquid phase, and to prevent or minimize the deposition of carbon on oil inlet 45. Combustion chamber 12 is supplied, for example, with two diametrically opposite tangential inlets 15. In each tangential inlet, is a burner 16 which is provided with a suitable supply of fuel and oil, not shown. Integral with liner 11A is a helical rib 48, of the type described in connection with Figure 2. Also positioned within reaction chamber 13 is a refractory cylinder 47, which is supported on helical baffle 48, thus providing additional radiant surface within the reaction chamber 13.

Refractory cylinder 47 is of the type described in the copending application of W. H. Rushford and H. A. Larson, Serial No. 391,956, filed November 13, 1953. Refractory cylinder 47 is open at both ends and is supported by helical rib 48 in spaced relationship with respect to the walls of reaction chamber 13. Cylinder 47 can be constructed of any suitable refractory such as alumina or zirconia and can be of the same material as liner 11A and rib 48. During operation, cylinder or tube 47 is heated to incandescence by contact with the helically moving blanket of combustion gas formed by the introduction of fuel and air tangentially into combustion chamber 12 through burner 16. Cylinder 47 thus provides increased radiant surface which transfers heat to the reactant hydrocarbon introduced through oil inlet 45. The reactant hydrocarbon can flow through the interior and also along the exterior of cylinder 47. Helical rib 48 has the additional effect of maintaining helical motion of the gas flowing around the outside of cylinder 47 and thus of maintaining a given body of the combustion gas in contact with cylinder 47 for a maximum length of time.

Tube 47 can be of any desired cross-sectional configuration, e. g., elliptical or circular. It is preferred that the cross-section be substantially the same in shape as that of reaction chamber 13 and further that the shape of tube 47 be that of a right circular cylinder. In order to promote smooth flow through the reactor, it is preferred that tube 47 be coaxially positioned within reaction chamber 13; however, cylinder 47 can be laterally displaced so that it is slightly eccentric in respect to cross section 13. In any event, it is preferable that the axis of tube 47 be either parallel or coincident with respect to the axis of chamber 13.

The upstream end of tube 47 should be remote or spaced from the inlet end of reaction chamber 13, i. e., the upstream end of tube 47 should be displaced in a downstream direction from combustion chamber 12 in order to allow direct contact between the helically moving combustion gas and the axially introduced reactant hydrocarbon prior to the time that the latter reaches tube 47. It is further preferred that the upstream end of tube 47 be positioned downstream from the inlet end of chamber 13 by from 3 to 10 percent of the length of chamber 13. Tube 47 can extend completely to the downstream end of chamber 13 if desired, but it is generally unnecessary that tube 47 be that long.

When the internal diameter of chamber 13 is less than six inches, the total inside and outside surface area of tube 47 plus the inside surface area of chamber 13 should be from 1.25 to 1.50 times the volume of chamber 13 per foot of length thereof. When the internal diameter of chamber 13 is six inches or greater, the total internal and external surface area of tube 47 plus the inside surface area of chamber 13 should be from 0.8 to 1.0 times the volume of chamber 13 per foot of length thereof.

It is further desirable that the ratio of the internal cross-sectional area of tube 47 to the internal cross-sectional area of the annulus between tube 47 and wall of chamber 13 be within the range 0.5:1 to 3:1.

From the foregoing it will also be evident that a cylindrical tube of the type of tube 47 in Figure 9 can be supported on a longitudinal rib shown in Figures 6 and 7.

Figure 11 is a schematic flow diagram illustrating a general type of flow system to which the present invention can be applied. Reactant hydrocarbon enters preheating zone 35 through inlet 34. In zone 35 the hydrocarbon is preheated to an elevated temperature preferably below a carbon black-forming temperature. When the reactant hydrocarbon is a liquid, vaporization can be effected in zone 35. Preheated hydrocarbon enters reactor 37 through inlet 36 and is converted to carbon black by a process of the type described in connection with the foregoing figures. Air or a fuel-air mixture enters reactor 37 through inlet 38. A mixture of carbon black and gas flows from reactor 37 through pipe 39 and is cooled in pipe 39 to a temperature at which reaction ceases, e. g. below 1000° F. The cooling can be effected by heat exchange with the atmosphere, in which case pipe 39 is uninsulated or by direct contact with water introduced through quench line 40, or by both such methods, or by any other known method, such as by indirect heat exchange with a coolant liquid. Cooled effluent is passed to separation means 41, which can be any known means for separating suspended solids from gases, e. g. one or more cyclone separators, bag filters, and/or electrostatic precipitators. Off-gas is withdrawn through outlet 42. Carbon black is recovered as product by means of outlet 43.

EXAMPLE

A reactor of the type illustrated in Figure 2 was constructed and operated to obtain a comparison of carbon black produced therein with carbon black produced in a similar reactor not provided with helical rib 19. The combustion section 12 had a length of 12 inches and a diameter of 34 inches. The reaction chamber 13 had a length of 11 feet and a diameter of 15 inches. The entire reactor was lined with a refractory material designated by the commercial trade name Mulfrax. Integral with the liner was a helical rib which began at the inlet of reaction chamber 13 and extended four feet into the reaction chamber. The height of the rib was two inches and the pitch thereof was $6^{13}/_{16}$ inches. (It has been found desirable that the helical rib extend at least two feet into the reaction chamber in a reactor of the dimensions as set forth herein).

The above reactor was compared with a similar reactor having the same dimensions but without the helical rib in the reaction section.

Each reactor was provided with an air jacketed oil inlet of the type shown in Figure 9.

Table I contains the operation data for two runs which were conducted with a reactor according to this invention provided with an internal helical rib in the reaction section.

Table I

| Sample No. | 820 | 851 |
|---|---|---|
| Tangential Air, s. c. f. h. (14.7 p. s. i. a. and 60° F.) | 195,600 | 186,440 |
| Axial Air, s. c. f. h. (14.7 p. s. i. a. and 60° F.) | 4,170 | 3,900 |
| Total Air, s. c. f. h. (14.7 p. s. i. a. and 60° F.) | 199,770 | 190,340 |
| Tangential Gas, s. c. f. h. (14.7 p. s. i. a. and 60° F.) | 13,190 | 12,570 |
| Oil Rate, g. p. h. | 290 | 282 |
| Air:Oil ratio s. c. f. h./gal. | 690 | 686 |
| Air:Gas ratio s. c. f. h./s. c. f. h. | 15.2 | 15.2 |
| Carbon in off-gas, wt. percent | 18.84 | 19.04 |
| Production, Pounds carbon/hr. | 1,109 | 1.075 |
| Nitrogen in off gas, vol. percent | 68.38 | 68.21 |
| Feedstock, Bur. Mines Corr. Index | 89.4 | 90.0 |
| Yield, Pounds carbon/gal. oil | 3.82 | 3.80 |
| Photelometer, percent transmission | 88–90 | 88–90 |
| Tint, percent | 171 | 171 |

The photelometer value in the above table is a measurement of the tar content of the product carbon black and is determined by extracting a weighed sample of black with a measured volume of chloroform and measuring the percentage light transmission through the resulting solution, as compared with the light transmission of pure chloroform. A transmission value of 85 percent or higher is considered satisfactory in the industry.

The tint value is a standard test in the carbon black art and measures the color imparted to a known amount of zinc oxide by addition of a known amount of carbon black.

Table II shows data obtained by compounding the carbon blacks made in the two foregoing runs into a butadiene-styrene synthetic rubber recipe. The sample designated "control" is a high-grade commercial carbon black prepared in the furnace having no internal helical rib, but otherwise as previously described.

Table II

| Recipe, parts by weight (75:25 Butadiene-Styrene copolymer)*: | | | |
|---|---|---|---|
| GR-S-1000 | 100 | 100 | 100 |
| Carbon Black— | | | |
| No. 820 | 50 | | |
| No. 851 | | 50 | |
| Control | | | 50 |
| Zinc Oxide | 5 | 5 | 5 |
| Paraflux 2016 (saturated hydrocarbon polymer) | 3 | 3 | 3 |
| Stearic Acid | 1.5 | 1.5 | 1.5 |
| Sulfur | 2 | 2 | 2 |
| Mercaptobenzothiazole | 1.0 | 1.0 | 1.1 |
| Mooney Values: | | | |
| ML 1½, 212° F | 53 | 49.5 | 48.5 |
| ML 4, 212° F | 47.5 | 45.5 | 44.0 |
| 300% Modulus, p. s. i.: | | | |
| 30 min. cure at 307° F | 1,760 | 1,800 | 1,580 |
| 45 min. cure at 307° F | 2,180 | 2,100 | 1,900 |
| 60 min. cure at 307° F | 2,400 | 2,420 | 2,100 |
| Tensile at Break, p. s. i.: | | | |
| 30 min. cure at 307° F | 2,680 | 2,800 | 2,620 |
| 45 min. cure at 307° F | 2,910 | 2,920 | 2,900 |
| 60 min. cure at 307° F | 2,980 | 2,880 | 2,800 |
| Elongation at Break, percent: | | | |
| 30 min. cure at 307° F | 410 | 440 | 440 |
| 45 min. cure at 307° F | 380 | 390 | 420 |
| 60 min. cure at 307° F | 320 | 330 | 360 |
| Shore "A" Hardness: 45 min. cure at 307° F | 54 | 54 | 54 |
| ASTM Compression Set, percent: 45 min. cure at 307° F | 26.0 | 26.8 | 26.2 |
| Abrasion (45 min. cure at 307° F.): | | | |
| Loss, gm | 6.29 | 6.08 | 7.18 |
| Index, percent | 114 | 118 | 100 |

*75:25 weight ratio, emulsion polymerization, persulfate catalyst, 122° F.

The tests described above were conducted at 76 F.

The abrasion index is a percentage value based on a value of 100% arbitrarily assigned to the control.

The foregoing data show that the carbon blacks produced in the reactor constructed according to this invention were markedly superior in abrasion resistance to the carbon black produced in the reactor having no internal helical rib.

Variation and modification are possible within the scope of the disclosure and the claims to this invention, the essence of which is that, in a process in which a reactant hydrocarbon is converted to carbon black by contact with a hot combustion gas, there is provided the step of passing a resulting gas along a raised radiant surface in the reaction zone; and that, in a reactor adapted for conducting such a reaction, there is provided in a reaction section of such a reactor, a raised refractory member positioned contiguously with respect to the inner wall of the reaction section. Thus, a helical or straight groove can be cut in the refractory lining of the reaction section.

While certain structures, process steps, and examples are described for purposes of illustration, the invention is obviously not limited thereto.

I claim:

1. In a carbon black production reactor comprising a substantially cylindrical reaction chamber, inlet means adapted to direct fluid longitudinally through said chamber, outlet means in communication with said chamber, and inlet means tangentially positioned with respect to an inner wall of said reactor and adapted to direct fluid through said chamber in a substantially helical path, the improvement which comprises a refractory helix positioned within said reaction chamber contiguously with a wall thereof and conforming to the direction of said helical path.

2. A carbon black production reactor comprising, in combination: a substantially cylindrical combustion chamber coaxially and contiguously positioned in open communication with a substantially cylindrical reaction chamber having a smaller diameter than said combustion chamber, inlet means substantially axially positioned in an end wall of said combustion chamber, outlet means at the end of said reaction chamber opposite said combustion chamber, a refractory helix coaxially positioned in said reaction chamber contiguously with the wall thereof, and inlet means substantially tangentially positioned in a wall of said combustion chamber and adapted to direct fluid in a direction corresponding to that of said helix.

3. In a carbon black production reactor comprising a substantially cylindrical reaction chamber, inlet means at one end of said chamber, outlet means at the opposite end of said chamber, and inlet means for directing fluid through said chamber in a substantially helical path, the improvement which comprises a refractory helix longitudinally positioned within said chamber, the external diameter of said helix being substantially equal to the internal diameter of said chamber.

4. Apparatus comprising, in combination: a substantially cylindrical reaction chamber, inlet means at one end of said chamber, outlet means at the opposite end of said chamber, a substantially helical refractory member positioned within said chamber contiguously with the wall thereof, and inlet means tangentially positioned in a wall of said chamber and adapted to direct fluid in a path conforming to said refractory member.

5. A carbon black production reactor comprising, in combination: a substantially cylindrical combustion chamber coaxially positioned adjacent and in open communication with a substantially cylindrical reaction chamber having a smaller diameter than said combustion chamber; axially positioned inlet means in said combustion chamber; nonaxially positioned inlet means in said combustion chamber; at least one raised refractory rib attached to a side wall within said reaction chamber and extending generally in a direction from the inlet toward the outlet throughout the major longitudinal extent thereof; and outlet means in said reaction chamber at the end thereof opposite said combustion chamber.

6. In a carbon black production reactor comprising a substantially cylindrical reaction chamber, inlet means adapted to direct fluid axially into said chamber, inlet means adapted to direct fluid nonaxially into said chamber, and outlet means adapted to permit removal of products from said chamber, the improvement which comprises at least one raised refractory rib member positioned within said chamber and extending longitudinally, contiguously with a side wall throughout the major longitudinal extent thereof.

7. In a carbon black production reactor comprising a cylindrical combustion chamber coaxially positioned in open communication with an adjacent cylindrical reaction chamber having a smaller diameter than said combustion chamber, inlet means adapted to direct fluid axially into said chambers, inlet means adapted to direct fluid longitudinally and nonaxially into said chambers, and outlet means at the end of said reaction chamber opposite said combustion chamber, the improvement which comprises a plurality of longitudinally extending refractory ribs positioned within said reaction chamber adjacent a side wall and extending throughout the major longitudinal extent thereof.

8. In a process in which a carbonaceous material is converted to carbon black in a reaction zone by virtue of heat directly absorbed from a hot gas, the improvement which comprises passing the heated carbonaceous material adjacent a radiant, ribbed surface in said zone extending throughout the major longitudinal extent thereof.

9. In a process in which a hydrocarbon is heated to a carbon black forming temperature by contact with hot combustion gas and reacted to form carbon black in a reaction zone, the improvement which comprises passing the heated hydrocarbon adjacent a plurality of radiant ribbed surfaces extending longitudinally within said zone throughout the major longitudinal extent thereof.

10. A process according to claim 9 wherein said ribbed surfaces are substantially straight and substantially parallel to the axis of said reaction zone, said zone being substantially cylindrical.

11. In a process in which a hydrocarbon is heated to a carbon black forming temperature by direct heat exchange with a surrounding sheath of hot gas, the improvement which comprises passing a resulting gaseous mixture along a radiant helical surface, reacting said hydrocarbon to form carbon black, and recovering said carbon black.

12. A process which comprises forming a helically moving sheath of hot combustion gas, passing a hydrocarbon into the interior of said sheath, whereby heat is directly transferred from said gas to said hydrocarbon and said hydrocarbon is heated to a carbon black forming temperature, passing a resulting gas along a helical radiant surface, reacting said hydrocarbon to form carbon black, and recovering said carbon black.

13. A process which comprises directing a combustible mixture comprising a fuel and oxygen tangentially into a cylindrical combustion zone, substantially completely reacting said mixture by combustion within a peripheral part of said zone, passing resulting hot combustion gas along an inward spiral path in said zone, passing a hydrocarbon longitudinally through said combustion zone, passing said resulting gas along a substantially helical surface contiguous with the wall of a cylindrical reaction zone which is coaxial with and has a smaller diameter than said combustion zone, reacting said hydrocarbon to form carbon black by means of heat imparted from said combustion gas, and recovering said carbon black.

14. A process which comprises directing an oxygen-containing gas tangentially into a cylindrical reaction zone, directing a hydrocarbon axially into said zone, thereby forming a helically travelling flame by partial combustion of said hydrocarbon and causing at least part of said hydrocarbon to be heated to a carbon black forming temperature, passing the resulting gas from said combustion along a helical surface contiguous with the wall of said zone, reacting said hydrocarbon in said zone to form carbon black, and recovering said carbon black.

15. In a carbon black production reactor comprising a cylindrical combustion chamber coaxially positioned in open communication with an adjacent cylindrical reaction chamber having a smaller diameter than said combustion chamber, inlet means adapted to direct fluid axially into said chambers, inlet means adapted to direct fluid longitudinally and non-axially into said chambers, an outlet means at the end of said reaction chamber opposite said combustion chamber, the improvement which comprises a plurality of straight, longitudinally extending refractory ribs positioned within said reaction chamber adjacent a side wall thereof and substantially parallel to the axis thereof.

16. A carbon black production reactor comprising, in combination: a substantially unobstructed and cylindrical combustion chamber coaxially and contiguously positioned in open communication with a cylindrical reaction chamber having a smaller diameter than said combustion chamber, inlet means substantially axially positioned in an end wall of said combustion chamber, outlet means at the end of said reaction chamber opposite said combustion chamber, a refractory helix coaxially positioned in said reaction chamber contiguously with the wall thereof, and inlet means substantially tangentially positioned in a wall of said combustion chamber and adapted to direct fluid in a direction corresponding to that of said helix.

17. Apparatus comprising, in combination: a cylindrical reaction chamber, inlet means at one end of said chamber, outlet means at the opposite end of said chamber, a substantially helical refractory member positioned within said chamber contiguously with the wall thereof, and inlet means tangentially positioned in a wall of said chamber and adapted to direct fluid in a path conforming to said refractory member.

18. In a carbon black production reactor comprising a cylindrical combustion chamber coaxially positioned in open communication with an adjacent cylindrical reaction chamber having a smaller diameter than said combustion chamber, inlet means adapted to direct fluid axially into said chambers, inlet means adapted to direct fluid longitudinally and nonaxially into said chambers, and outlet means at the end of said reaction chamber opposite said combustion chamber, the improvement which comprises a plurality of longitudinally extending refractory ribs positioned within said reaction chamber adjacent a side wall thereof, said ribs having a helical pitch not less than half the length of said reaction chamber.

19. In a carbon black production reactor comprising a cylindrical combustion chamber coaxially positioned in open communication with an adjacent cylindrical reaction chamber having a smaller diameter than said combustion chamber, inlet means adapted to direct fluid axially into said chambers, inlet means adapted to direct fluid longitudinally and nonaxially into said chambers, and outlet means at the end of said reaction chamber opposite said combustion chamber, the improvement which comprises a plurality of longitudinally extending refractory ribs positioned within said reaction chamber adjacent a side wall thereof, said ribs having a helical pitch at least as great as the length of said reaction chamber.

20. In a carbon black production reactor comprising a cylindrical combustion chamber coaxially positioned adjacent and in open communication with a cylindrical reaction chamber of smaller diameter than said combustion chamber, said combustion chamber having axially positioned inlet means and tangentially positioned inlet means, the improvement comprising, in combination: a refractory reaction cylinder coaxially positioned within said reaction chamber and spaced from the wall thereof, and at least one helical refractory rib member contiguous with the wall of said reaction chamber and with the periphery of said cylinder, said cylinder being substantially shorter than said reaction chamber, positioned in a part thereof adjacent said combustion chamber, and longitudinally spaced from said combustion chamber.

21. An improved reactor according to claim 20 wherein said cylinder is spaced from said combustion chamber by from 3 to 10 percent of the length of said reaction chamber, and the ratio of the internal cross-sectional area of said cylinder to the cross-sectional area of the surrounding annulus is from 0.5:1 to 3:1.

References Cited in the file of this patent

UNITED STATES PATENTS

| | | |
|---|---|---|
| 459,892 | Weir | Sept. 22, 1891 |
| 727,540 | Harvey | May 5, 1903 |
| 1,433,450 | Geiger | Oct. 24, 1922 |
| 1,655,566 | Reintjes | Jan. 10, 1928 |
| 1,862,892 | Haskell | June 14, 1932 |
| 1,980,827 | Reed | Nov. 13, 1934 |
| 2,154,414 | Teeters | Apr. 11, 1939 |
| 2,172,399 | Mueller | Sept. 12, 1939 |
| 2,188,133 | Hepburn | Jan. 23, 1940 |
| 2,420,999 | Ayers | May 27, 1947 |
| 2,498,444 | Orr | Feb. 21, 1950 |
| 2,556,196 | Krejci | June 12, 1951 |
| 2,564,700 | Krejci | Aug. 21, 1951 |
| 2,596,341 | McCreerey et al. | May 13, 1952 |
| 2,616,794 | Krejci | Nov. 4, 1952 |
| 2,785,053 | Larson et al. | Mar. 12, 1957 |